United States Patent [19]
Bowne et al.

[11] Patent Number: 5,569,387
[45] Date of Patent: Oct. 29, 1996

[54] WASTEWATER COLLECTION AND DISCHARGE SYSTEM

[76] Inventors: William C. Bowne, 2755 Warren, Eugene, Oreg. 97405; Gary L. Thorsby, 3790 Honolulu Ave., Eugene, Oreg. 97404

[21] Appl. No.: 338,401

[22] Filed: Nov. 14, 1994

[51] Int. Cl.$^6$ ............................................ B01D 35/16
[52] U.S. Cl. .................. 210/754; 210/791; 210/800; 210/86; 210/407; 210/472; 210/532.2; 210/539; 210/523; 15/104.05; 15/104.16; 15/104.31
[58] Field of Search ................ 15/104.03, 104.05, 15/104.16, 104.31; 210/86, 754, 791, 800, 407, 408, 472, 523, 532.2, 538, 539

[56] References Cited

U.S. PATENT DOCUMENTS

| | | | |
|---|---|---|---|
| 19,030 | 1/1858 | Ingram | 15/104.31 |
| 1,902,171 | 3/1933 | Kopp . | |
| 2,767,801 | 10/1956 | Eads | 182/2 |
| 3,025,962 | 3/1962 | Williams . | |
| 3,612,279 | 10/1971 | Hostetter | 210/170 |
| 3,662,890 | 5/1972 | Grimshaw | 210/195 |
| 3,954,612 | 5/1976 | Wilkerson | 210/86 |
| 4,319,998 | 3/1982 | Anderson | 210/86 |
| 4,348,278 | 9/1982 | Caccia | 210/86 |
| 4,439,323 | 3/1984 | Ball | 210/608 |
| 4,710,295 | 12/1987 | Zabel | 210/336 |
| 4,715,966 | 12/1987 | Bowman | 210/800 |
| 4,867,871 | 9/1989 | Bowne | 210/97 |
| 5,207,896 | 5/1993 | Graves | 210/109 |
| 5,242,584 | 9/1993 | Hoarau | 210/532.2 |
| 5,252,000 | 10/1993 | Mohs | 405/53 |
| 5,264,120 | 11/1993 | Graves | 210/532.2 |
| 5,382,357 | 1/1995 | Nurse . | |

OTHER PUBLICATIONS

Excerpt from Manual "Alternative Wastewater Collection Systems," U.S. EPA, pp. 165–166, Oct. 1991.
Promotional material from Orenco Systems, Inc. "Effluent Filters", three pages Publication date–Aug. 1989.
Promotional material from Treit Equipment Company, one page Published as least as early as Sep. 1993.
Promotional material from Zabel Industries, Inc., three pages Published at least as early as Sep. 1993.
Sketch illustrating installation of Zabel 2, published Aug. 16, 1994.

*Primary Examiner*—Robert J. Popovics
*Attorney, Agent, or Firm*—Chernoff, Vilhauer, McClung & Stenzel

[57] ABSTRACT

A system for treating wastewater and improving the quality of wastewater effluent by preventing solids from being discharged in the effluent is disclosed. Wastewater having a concentration of waste solids flows into a wastewater collection container through a waste-water inlet and solids are allowed to distribute into a lower horizontal sludge layer and an upper horizontal scum layer with a horizontal layer of liquid therebetween. A substantially upstanding elongate tube is immersed in the wastewater within the container and the interior of the tube is exposed to the horizontal layer of liquid through a plurality of inclined slots in the tube. Liquid flows from the horizontal liquid layer through the slots into the interior of the tube and thereafter through a liquid effluent outlet of the container. Preferably, the slots extend vertically along a majority of the depth of the wastewater in the container. A cleaning implement is moved along the interior of the tube while the tube remains immersed in the wastewater within the container, thereby cleaning the tube without removing it from the wastewater container. The tube also provides overflow protection for the wastewater collection container, and a clog-resistant means of attenuating flow from the container. The tube can be removed from the wastewater collection container and its exterior surface can be inspected to determine if the container requires pumping.

30 Claims, 7 Drawing Sheets

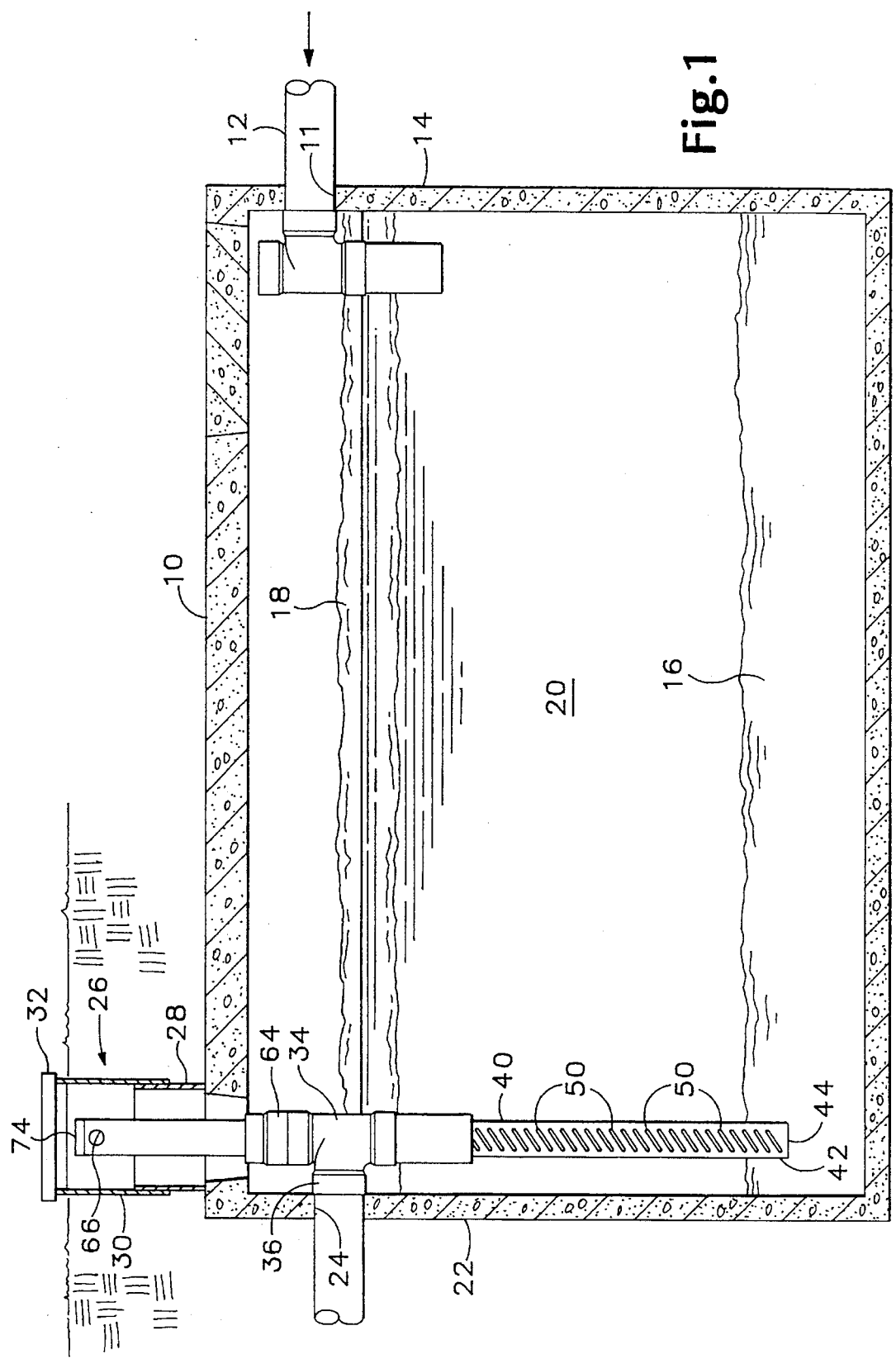

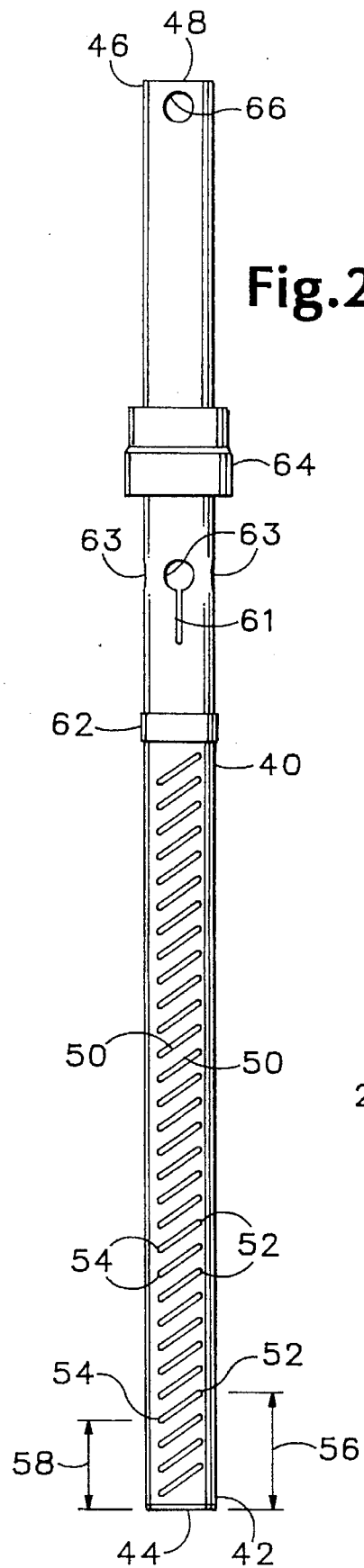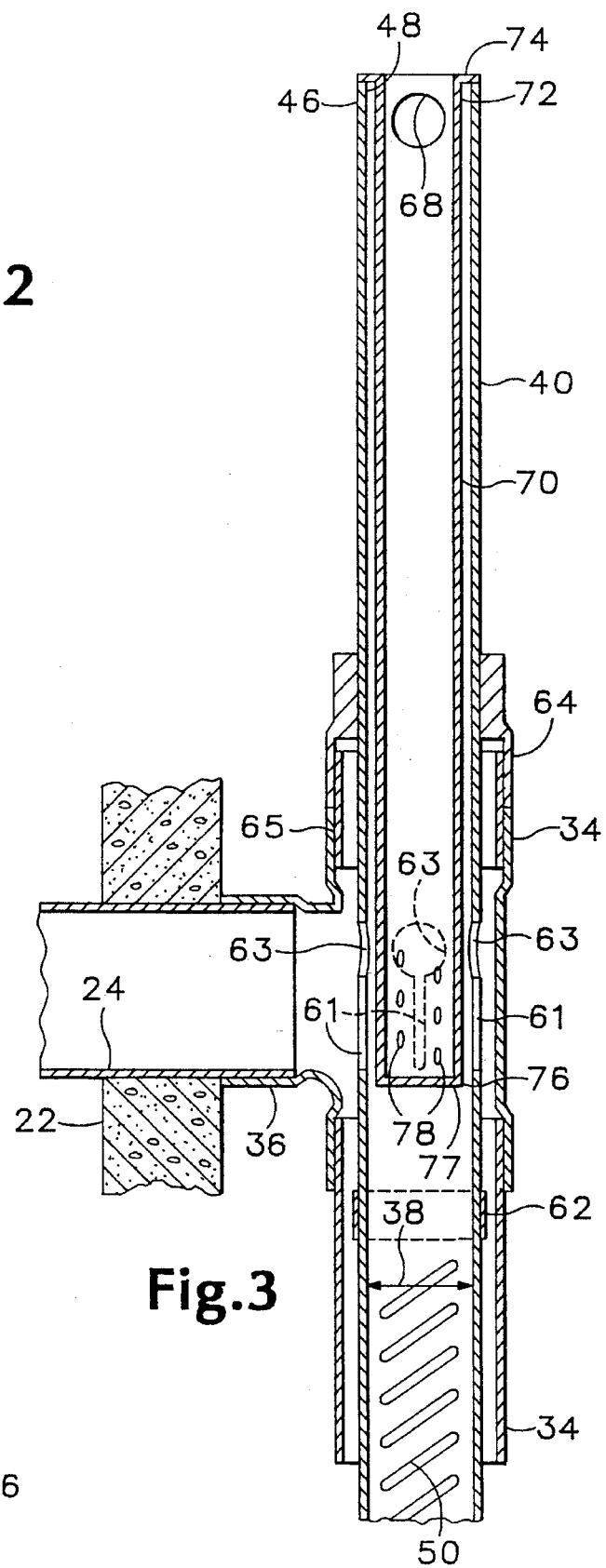

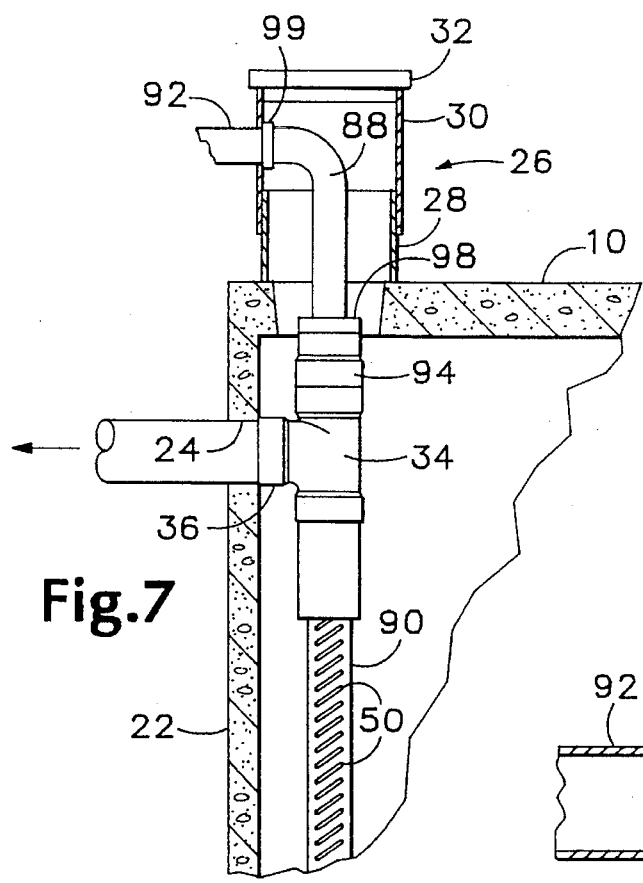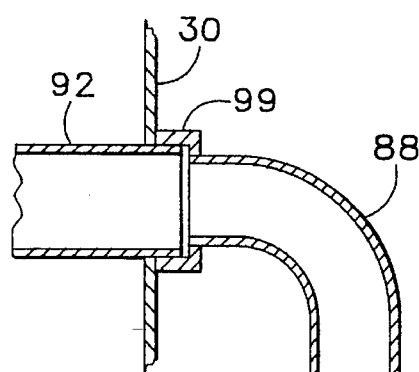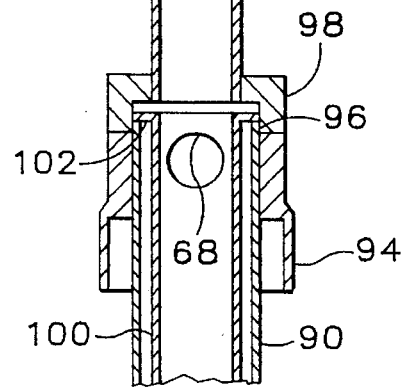

5,569,387

WASTEWATER COLLECTION AND DISCHARGE SYSTEM

BACKGROUND AND SUMMARY OF THE INVENTION

The present invention relates to a wastewater treatment system, and more particularly to a wastewater collection and discharge system for limiting the discharge of solids from a septic tank.

A typical wastewater treatment system which is operated by a homeowner or a small sanitary district includes a wastewater collection container such as a septic tank for primary treatment, followed by a sand filter, a mound, a gravity flow or pressurized drain field, drip irrigation, or a sand-filled drain field bed or trench for secondary treatment of the effluent from the container. Other systems which use a septic tank for primary treatment include septic tank-effluent pump pressure sewer systems and small diameter gravity sewers. The present invention is applicable to all such systems.

In a conventionally operated septic tank, raw sewage wastewater having a significant concentration of waste solids enters one end of the tank. In the septic tank, solids separate from the liquid portion of the sewage; solids having a lower density than the liquid move to the top of the liquid to form a scum layer, and the solids having a higher density than the liquid sink to the bottom of the tank to form a sludge layer, resulting in a relatively clear horizontal liquid layer between the scum and the sludge layers which gradually narrows as the scum and sludge layers accumulate and thus converge toward each other. The liquid portion of the wastewater is drawn from this liquid layer and discharged from the tank as the septic tank effluent by means of gravity, a pump, or a siphon.

The secondary treatment of the discharged effluent is frequently determined by selecting from the various alternatives the most economical method of obtaining an acceptably disposable effluent. A drain field is frequently the preferred type of secondary treatment because of the relative costs of the various alternatives, but the land available for the drain field may be geographically unsuitable for receiving septic tank effluent of the quality currently produced by available septic tanks. The quality of septic tank effluent is significantly improved by preventing the discharge of solids with the liquid effluent. The larger unintentionally discharged solids are troublesome when present in septic tank effluent because they impart a solids loading to the secondary treatment or disposal facilities. In addition, many septic tank effluent pumps are not capable of passing gross solids. Furthermore, solids can cause clogging in the small diameter orifices which are used in the piping systems of many pressurized systems.

It is known to surround the outlet of a septic tank with a cylindrical screen to prevent gross solids from being discharged with the effluent. Some septic tank effluent screens are made from a mesh having a square mesh opening of about ⅛ inch. However, if such a mesh screen is used where a high proportion of solids is encountered, the mesh becomes clogged. Also, some stringy solids become woven into the mesh. When such a screen becomes clogged the homeowner or maintenance provider must remove and clean the screen because none of the known screens can be cleaned while remaining in place in the septic tank. In the most severe of cases, a clogged screen may result in a service interruption until such maintenance can be performed.

As solids digest in a septic tank considerable gas is produced, about one cubic foot per capita-day. The gas bubbles become attached to solid particles and lift them from the sludge layer toward the scum layer. Similarly, a heavier-than-water solid that was gas lifted to the scum layer settles back down toward the sludge layer when the gas bubble is released. Thus, these mobile solids pass through the clear layer between the sludge and scum and can escape with the effluent drawn from that layer. When the screen surrounding the outlet of the septic tank has a closed bottom a screening action occurs as the effluent passes into the screen prior to exiting the septic tank outlet conduit. However, as noted, these screens tend to clog. When such a screen has an open bottom the screening action occurs as the effluent exits the screen. However, mobile solids rise vertically through the bottom of the screen and cause the interior of the screen to become clogged. In an attempt to overcome the clogging problem common to the mesh screens, screens with horizontal slot-shaped openings have been used. However, the solids present in the septic tank are often flat, not spherical, and as the solids travel most of them tend to be horizontally or vertically oriented. The horizontally-oriented mobile solids are not effectively screened out of the effluent by the horizontally slotted screens, which severely limits the effectiveness of the horizontally slotted screens.

A standard septic tank outlet withdraws effluent from a predetermined level coinciding with the level where the effluent is expected to be most free of solids. This is typically the expected level of eventual convergence of the top of the sludge layer and the bottom of the scum layer. The calculation of that predetermined level is based on sludge and scum layer accumulations of an average household. However, it has been shown that sludge and scum layers accumulate at widely varying rates. Consequently, it is rare that the level from which effluent is drawn is properly established for the home actually being served. Unless the tank is pumped often, sludge or scum encroaches prematurely on the outlet and is carried out with the effluent, imposing an undesirable solids loading on the secondary treatment or disposal facility as described previously, and possibly clogging such facility and its fluid conduits. Furthermore, in a conventionally operated septic tank the homeowner cannot predict when pumping of the tank may be necessary, and the family is at risk for an inconvenient service interruption and damage to the secondary treatment or disposal facility.

Thus, a need exists for an improved system for limiting the solids discharged from a wastewater collection container such as a septic tank while compatibly overcoming the problems of prior systems.

According to one aspect of the present invention, such need is satisfied by immersing a substantially upstanding elongate tube in the wastewater within a septic tank or comparable container, with the interior of the tube exposed to the clear horizontal layer of liquid through a plurality of apertures in the tube which prevent the passage of larger solids. The liquid flows from the horizontal layer through the apertures into the interior of the tube and thereafter through a liquid effluent outlet of the container. A cleaning implement is moved along the interior of the tube while the tube remains immersed in the wastewater within the container thereby cleaning the tube and its apertures. Thus, the tube can be cleaned without removing it from the waste-water container. If the tube is permanently installed in the container, the homeowner is never tempted to remove the tube and discard it rather than perform the necessary routine maintenance.

According to another aspect of the invention, the exterior surface of a removable tube contacts not only the horizontal layer of liquid, but also at least the sludge layer and possibly also the scum layer depending upon use conditions. The tube is removed from the container and the exterior surface of the tube is inspected to identify the portions thereof which have been in contact with the solids layer or layers. Thus, the maintenance provider can remove and inspect the tube and determine the extent to which a solids layer is encroaching on the liquid layer. Regular inspections provide a measure of the rate of growth of the solids layers, so that the homeowner can easily determine if the wastewater container requires pumping.

According to another aspect of the invention, the apertures in the tube extend vertically along a majority of the depth of the wastewater in the container and contact at least the liquid layer and sludge layer while the tube substantially prevents the exposure of the interior of the tube to the scum layer through an upper extremity of the tube despite an overflow condition in the container. Thus, the apertures are not limited to a predetermined liquid level where premature encroachment of solids on the apertures may occur from unexpected rates of sludge and scum accumulation leading to undesirable solids loading on the secondary treatment or disposal facility. Instead, at least some apertures will normally always be open to the clear liquid layer, from which the effluent will continue to be withdrawn since such apertures will offer the least resistance to effluent flow. Even in the event of an unusually high liquid level in the container, access of solids to the interior of the tube will nevertheless be limited to access through the apertures.

According to another aspect of the invention, liquid flows from the horizontal liquid layer into the interior of the tube through apertures which comprise a plurality of elongate slots in the tube oriented longitudinally at an inclination. The inclined slots effectively exclude the majority of the mobile solids present in the horizontal layer of liquid because those mobile solids are oriented vertically or horizontally.

According to another aspect of the invention, liquid flows from the interior of the tube to the outlet through a first opening in the tube having a first width, thereby providing a restriction on the volumetric flow rate of the liquid. The liquid can also flow from the interior of the tube to the outlet through a second opening in the tube located at a higher elevation than the first opening and having a second width greater than the first width, thereby lessening the restriction. Thus, the first opening provides desirable flow attenuation of the container effluent but, if the first opening becomes clogged, the second opening nevertheless permits effluent to exit the container.

According to a further aspect of the invention, liquid flows from the horizontal liquid layer through the apertures into the interior of the tube and thereafter not only through the normal liquid effluent outlet but also through an overflow outlet in parallel with the normal outlet to an alternative disposal site if the normal outlet should temporarily be unable to accept effluent.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a sectional side view of en exemplary wastewater collection container embodying the present invention.

FIG. 2 is a side elevational view of an exemplary tubular screen used in the container of FIG. 1.

FIG. 3 is a sectional view of the container outlet of FIG. 1 shown at an enlarged scale with a portion of the container and screen.

FIG. 7 is a partially sectional view of an alternative embodiment of the invention, shown with a portion of the container and screen.

FIG. 8 is a sectional view of a portion of the apparatus of FIG. 7 shown at an enlarged scale.

DETAILED DESCRIPTION OF THE PREFERRED EMBODIMENTS

Figure 4:
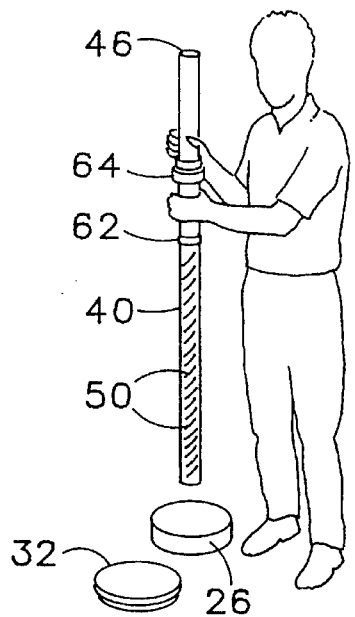
FIG. 4 is a representation of the installation in a container of the screen shown in FIG. 2.
Figure 5:
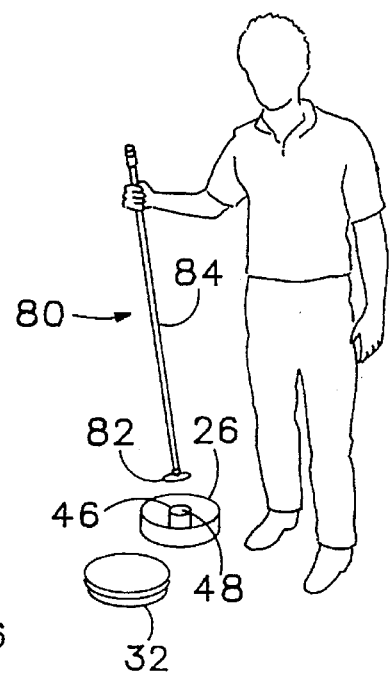
FIG. 5 is a representation illustrating the cleaning of the installed screen.
Figure 6:
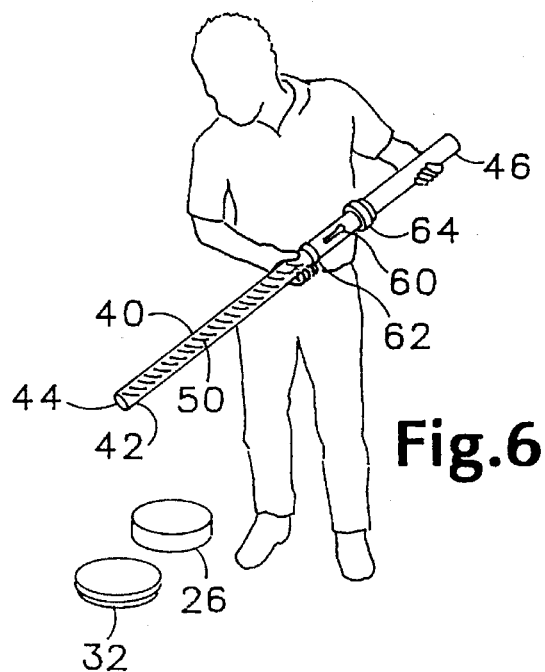
FIG. 6 is a representation illustrating the removal and inspection of the screen.

Referring now to an exemplary first embodiment illustrated in FIGS. 1–6, a wastewater collection container 10 such as a septic tank receives, typically from a residence, raw sewage wastewater having a significant concentration of waste solids at an inlet 11 through an inlet conduit 12 at a first end 14 of the wastewater container. The wastewater container is made Of any suitable material such as fiberglass or concrete and is typically buried in the earth. In the container 10 gravity and bacteria operate to divide the wastewater into three layers. The solids separate to distribute into a lower horizontal sludge layer 16 and an upper horizontal scum layer 18 with a relatively clear central horizontal liquid layer 20 therebetween.

At a second end 22 of the wastewater container 10, an outlet 24 is accessible through a riser 26 which provides access to the outlet from ground level. The riser 26 is preferably constructed of a first section 28 which is connected in telescoping relation to a second section 30 having a slightly larger diameter than the first section. The first section 28 is fastened to the wastewater container 10 by any convenient means such as a suitable adhesive. The height of the riser is adjustable to ground level by adjusting the location of the second section 30. In addition, the telescoping relationship between the two sections prevents transferring a load to the container if someone accidentally drives over the riser. The second section 30 is provided with a cover 32. The riser is made of any suitable material such as a polyvinylchloride polymer and typically has an 8-inch diameter. The cover is preferably an exposed aggregate concrete patio stone.

The container outlet 24 is coupled to a T-shaped outlet conduit having a horizontal portion 36 in fluid communication with a vertical portion 34. The vertical portion 34 encloses a portion of a tubular screen 40 for excluding solids from the container effluent. The screen 40 is an elongate tube (FIG. 2) having a diameter 38, a bottom end 42 including an end wall 44, and a top end 46 defining a diametrically unobstructed opening 48. The screen 40 defines a plurality of slot-shaped spaced-apart apertures 50, which are longer than they are wide, distributed over a substantial portion of the length of the tube preferably extending vertically along a majority of the depth of the wastewater in the container 10. These slot-shaped apertures 50 are oriented longitudinally at an inclination, that is, each aperture has a first end 52 and a second end 54 with the distance 56 from the first end of each aperture 50 to the end wall 44 being greater than the distance 58 from the second end of the aperture to the end wall. Preferably, the inclination is approximately 45°, although inclinations from about 20° to about 70° are satisfactory. In a preferred embodiment, the tubular screen is an ABS plastic sewer pipe having a 3.5-inch outside diameter, and a length sufficient for the bottom end of the pipe to extend near the bottom of the container 10. The top end 46 of the pipe may or may not extend into the riser. The screen preferably defines three rows of inclined slot-shaped apertures 50, each row containing 30 evenly-spaced apertures and being about 34 inches long. Each aperture is ⅛ inch wide and about 3 inches long.

The screen 40 further defines, between a ring 62 and a coupling 64, a first opening 61 and a second opening 63 which is located at a higher elevation than the first opening. In a preferred embodiment, the screen defines four of each of such openings 61 and 63. The first opening 61 is a narrow vertical slot with a width of ⅛ inch to about ¼ inch and a bottom level with the bottom of the outlet 24. The second opening 63 is a circularly-shaped opening with a diameter of 1¼ inches. The top of the slot 61 preferably intersects the circularly-shaped opening 63. Alternatively, the openings 61, 63 may be otherwise shaped, with each lower opening generally having a width smaller than the width of each higher opening. A finger aperture 66, preferably circularly shaped, is located proximate the top end 46 of the screen 40.

The screen 40 may optionally receive a removable chlorinator pipe 70 having a suitable diameter (FIG. 3). An end 72 of the chlorinator pipe 70 defines a lip 74 for engaging the top end 46 of the screen 40, and an end 76 of the pipe defines an end wall 77 for supporting calcium hypochlorite tablets (not shown). The pipe 70 defines a plurality of holes 78 proximate the end wall 77 through which the container effluent flows to immerse the tablets. The length of the chlorinator pipe 70 is selected so that the end wall 77 is at or very slightly above the bottom of the opening 61 and the holes 78 extend generally coextensively with the opening 61 to insure immersion of the tablets. A finger aperture 68, preferably circularly-shaped, is located proximate the end 72 of the chlorinator pipe 40.

A cleaning swab 80 (FIG. 5) is provided for cleaning the tubular screen 40 while the screen remains in place in the wastewater container 10 immersed in the wastewater. The swab 80 includes a disc 82 with an attached handle 84. The disc 82 has a diameter about equal to the inside diameter 38 of the screen 40. In a preferred embodiment the disc is made of a deformable material such as neoprene.

In operation, the screen 40 is easily coupled to the wastewater collection container 10. The cover 32 of the riser 26 is removed to provide access to the outlet 24 as shown in FIG. 4. The screen 40 is slidably inserted through the vertical portion 34 of the container outlet conduit until the coupling 64 slips over a short stub pipe 65 fastened to the vertical portion 34, at which point at least a portion of the slot-shaped apertures 50 are in fluid communication with the horizontal liquid layer 20 in the container 10. The ring 62 leaves an annular space no wider than the apertures 50, preventing larger solids from entering the horizontal portion 36 of the outlet conduit. Liquid from the relatively clear horizontal layer 20 flows through the slot-shaped apertures 50 into the interior of the screen 40, and then out of the screen through the opening 61 and into the horizontal portion 36 of the container outlet conduit to be discharged as effluent from the container 10. To the extent solids of a size greater than that which will pass through the apertures 50 are present in the container wastewater, the screen will substantially exclude such solids from the container effluent. Mobile solids of such size are likewise prevented from entering the bottom of the screen because the bottom of the screen is enclosed by the end wall 44, which may or may not be slotted. Such solids are also prevented from entering the annular space between the ring 62 and vertical portion 34 of the container outlet. In addition, because the slot-shaped apertures 50 are oriented at an inclination, some mobile solids are prevented from entering the interior of the screen through the apertures because the mobile solids tend to be either horizontally or vertically oriented. The slot-shaped apertures 50 also exclude troublesome solids such as sanitary napkins, cigarette filters, plastic sandwich wrap, condoms, vegetable and fruit peelings, chewing gum and bits of paper and cloth, but they are not so narrow as to be clogged by less troublesome solids such as seeds, clumps of detergent, lint, or hair.

In addition, if a solid should enter the screen 40 but become lodged in the narrow restrictive opening 61, liquid can continue to flow out the much wider and less restrictive opening 63 which, because of its intersection with the opening 61, tends to wash away the obstruction. Thus, the openings 61 and 63 also resist clogging, while nevertheless providing a restriction to the effluent flow through the narrow opening 61. Such restriction limits flow velocities through the container during peak usage periods and thus reduces the amount of solids scoured out of the container with the effluent during such periods. The restriction provided by the narrow opening 61 also insures immersion of the tablets in the chlorinator pipe 70 during low usage periods.

Because the slot-shaped apertures 50 are distributed over a substantial portion of the length of the screen 40, preferably extending vertically along a majority of the depth of the wastewater in the container 10, liquid will continue to enter the screen from the clear layer 20 even if the sludge layer 16 and the scum layer 18 do not accumulate solids and converge as predicted. As the layers accumulate solids, whether or not at rates different from the predicted rates, at least the apertures 50 near the sludge layer will also accumulate solids. However, the apertures 50 receiving the flow carrying the fewest solids will present the least resistance to flow, and the greatest flow will therefore continue to enter the screen from the clearest zone.

The homeowner or service person can remove the screen for visual inspection (FIG. 6), and can determine if the wastewater container needs pumping to remove the accumulated solids by observing the change in the area and location of the exterior of the screen most free of solids. The screen is simply and easily removed from the wastewater container. The service person merely inserts a finger in the easily accessible aperture 66 proximate the top end 46 and lifts the screen slidably out of the vertical portion 34 of the outlet conduit for cleaning or inspection, leaving the outlet conduit 34, 36 in place. The retention of the outlet conduit 34, 36 in the container upon removal of the screen is highly important because, if the user neglects to replace the screen, the vertical portion 34 of the outlet conduit will still insure that the effluent is drawn from the clear liquid layer 20. By removing the screen for inspection, users may also become aware that they have been disposing of materials that should not be discharged to the wastewater container.

If the screen eventually does clog, the home occupant or service person can clean the screen while it remains immersed in the wastewater and without removing it from the wastewater container. With the cover 32 of the riser 26 removed, the optional chlorinator pipe 70 is lifted out of the screen by inserting a finger into the aperture 68 and the cleaning swab 80 is inserted through the diametrically unobstructed top end 46 of the screen 40 (FIG. 5) into the interior of the screen. As the disk 82 is forced longitudinally along the interior of the screen any solids lodged in the slot-shaped apertures 50 are dislodged back into the container. Alternatively, the homeowner can remove the screen from the container and rinse it clean.

In some instances, a non-removable screen may be desirable because such a screen cannot be removed and discarded by an uncaring occupant in the event that it becomes clogged. Thus, the screen 40 may alternatively be permanently installed in the wastewater container, for example, by cementing the coupling 64 to the stub pipe 65. The permanently installed screen is cleaned in place by using the swab as described above.

In an alternative embodiment of the present invention the wastewater container effluent is discharged through the outlet 24 to a small diameter gravity sewer. As shown in FIGS. 7 and 8, the vertical portion 34 of the outlet conduit includes a tubular screen 90, similar to the screen 40 previously described, having slot-shaped apertures 50. An overflow conduit 88 couples the screen 90 to conduit 92 which exits the riser 26 and leads to an abandoned drain field or some other on-site disposal facility. A coupling 94 proximate the top end 96 of the screen 90 abuts the top of the vertical portion 34 of the outlet conduit. Immediately above the coupling 94, a quick-disconnect coupling 98 provides a slidably detachable, sealed interconnection between the top of the screen 90 and the conduit 88. A similar slidably detachable coupling 99 interconnects the conduit 88 with the conduit 92. A chlorinator pipe 100 similar to the chlorinator pipe 70, but having a length suitable for the length of the screen 90, is insertable into the screen 90 so that a lip 102 of the pipe rests on the top end 96 of the screen (FIG. 8). In the event that the screen 90 clogs, access to the screen is provided by detaching couplings 98 and 99 and removing the conduit 88. The chlorinator pipe 100 is removed by inserting a finger in the aperture 68 and lifting the pipe out of the screen as previously described. The cleaning swab 80 is then inserted into the diametrically unobstructed end 96 of the screen 90 and the disc 82 is forced the length of the interior of the screen to remove the clogging solids.

The interconnection of the screen 90 with the conduit 92 to provide an overflow outlet to the drain field provides considerable assurance to homeowners that they will not be inconvenienced due to a service interruption, such as when valves in the small diameter gravity sewer main are closed or the main or service line is clogged. The homeowners may notice that flow from the home is sluggish when the wastewater collection container is full and overflowing to the drain field, or a mechanical alarm can warn of this condition. In addition, when a collection container is connected to a small diameter gravity sewer, odor problems in the home are common because of gases venting back from the sewer main through the wastewater container and out the roof vent of the home. This problem is overcome in the embodiment of FIG. 7 because the conduit 92 also vents odor-producing gases to the drain field. In the absence of a drain field, a ten-foot length of perforated pipe (not shown) can be placed in the same trench as the sewer main, surrounded with drain field gravel, and topped with organic loam for dissipating the odorous gases.

Figure 9:
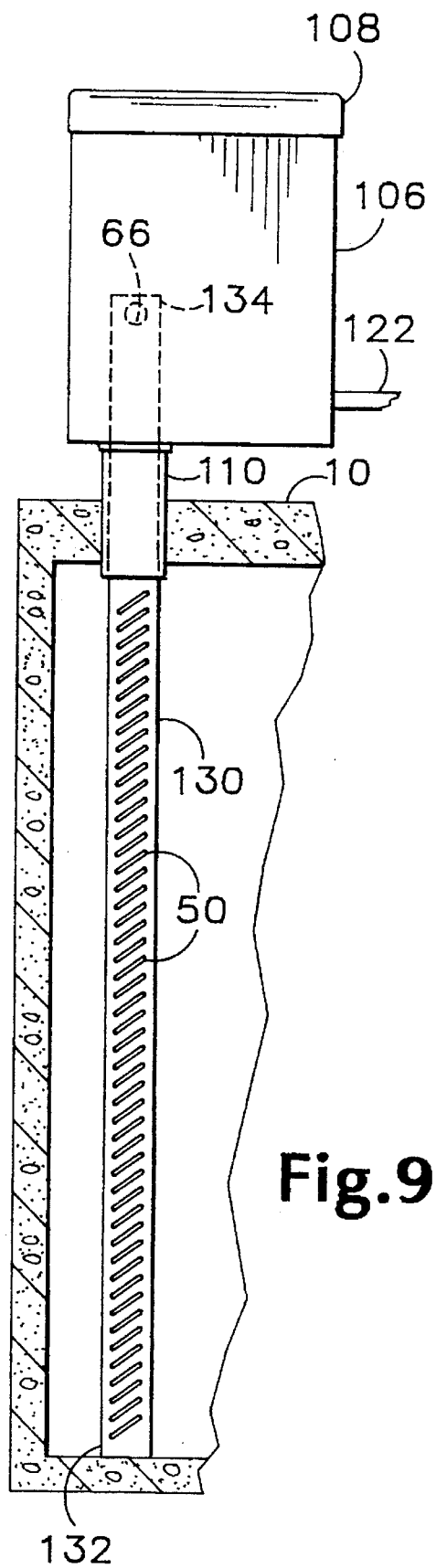
FIG. 9 is a partially sectional view of a further alternative embodiment of the invention, shown with a portion of the collection container.
Figure 10:
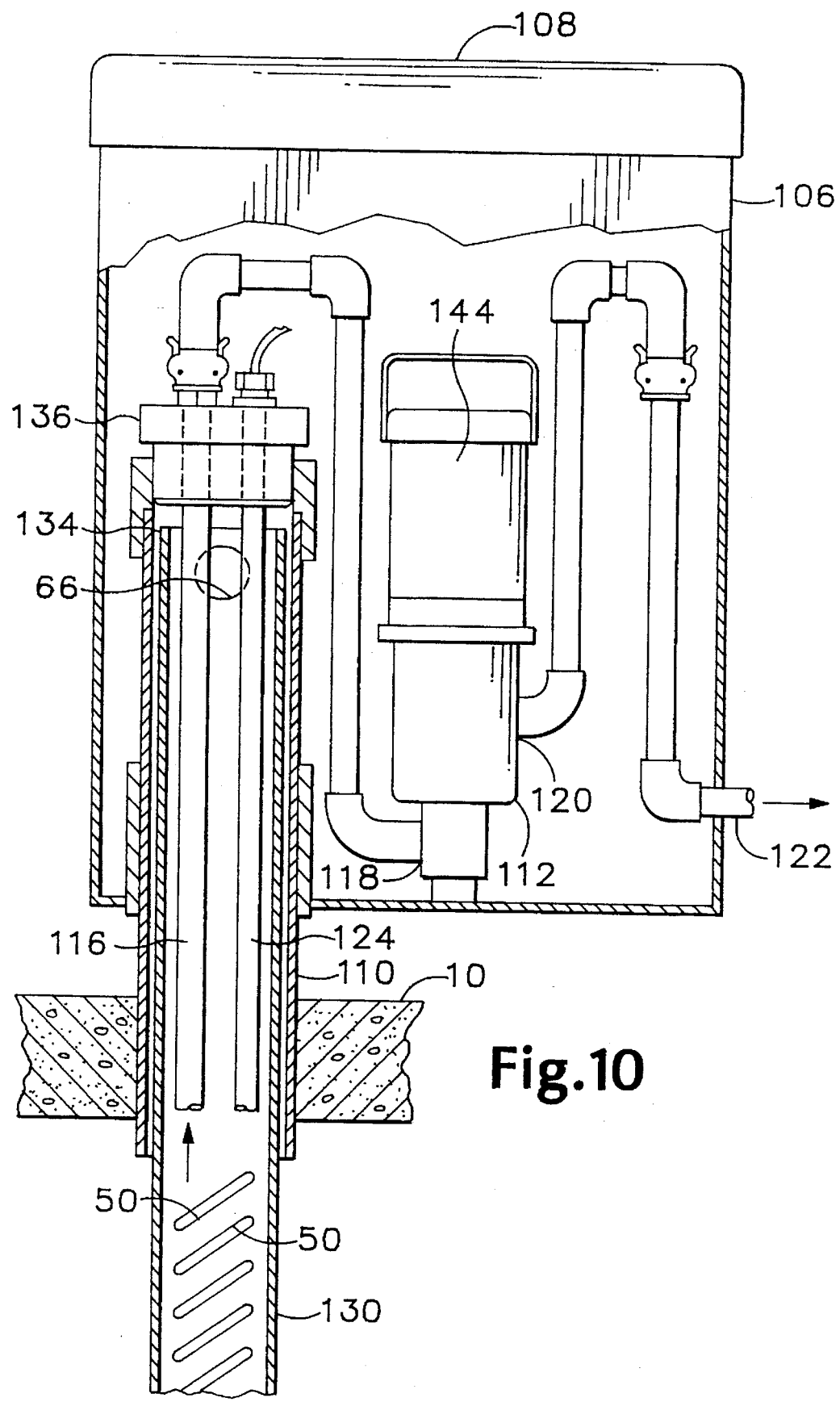
FIG. 10 is a simplified sectional side view of a portion of the embodiment of FIG. 9, shown at an enlarged scale with a portion of the container and screen.

As shown in FIGS. 9 and 10, in an alternative embodiment of the present invention the wastewater container effluent is discharged through a pump rather than by gravity. A housing 106 with a removable cover 108 is connected to the container 10 by a pipe 110. The housing and its contents are preferably, but not necessarily, of the general quick-disconnect type disclosed in U.S. Pat. No. 4,867,871 which is incorporated herein by reference. The housing 106 contains a pump 112 driven by a motor 114 to remove effluent from the container intermittently through an outlet tube 116. The pump 112 has an inlet 118 which is connected to the fluid outlet tube 116, and an outlet 120 which is connected to a fluid outlet tube 122 which passes out of the housing 106 and extends to a suitable disposal area. The motor 114 is operated by a controller (not shown) which includes a level sensor which initiates operation of the pump 112 when the fluid level in the container 10 increases to a first predetermined level and terminates operation of the pump when the fluid level drops to a second predetermined level. The level sensor includes a trapped air or bubbler type liquid level sensing tube 124 which extends out of the housing 106 into the container and terminates below the second predetermined fluid level. Alternatively, other types of sensors such as a proximity sensor may be used. The fluid outlet tube 116 and the sensing tube 124 terminate within a screen 130 located exterior of the housing 106. The screen 130 is a tube similar to the screen 40 and the screen 90 previously described, having a length sufficient to abut the bottom end 132 of the screen supportably on the bottom of the container and having a diametrically unobstructed upper end 134 within the pipe 110. As previously described, the screen 130 defines a plurality of spaced-apart, inclined slot-shaped apertures 50 distributed over a substantial portion of the length of the tube. The peripheral clearance between the screen and the pipe 110 is small enough to prevent the entry of solids large enough to be excluded by the apertures 50. To facilitate installation and removal of the screen 130, while concurrently maintaining it separate from the interior of the housing 106, a threaded coupling 136 is provided atop he pipe 110. Initial installation of the screen 130, and subsequent access thereto, are provided by removing the cover 108, releasing the coupling 136, and removing the inlet tube 116 and the sensing tube 124 from the container. The screen 130 is thereafter insertable into the pipe 110, or removable therefrom by inserting a finger in the aperture 66 and lifting the screen from the container. Alternatively, the screen can be cleaned in place by inserting the swab 80-through the diametrically unobstructed end 134 of the screen. The screen 130 operates to exclude solids from the effluent in the manner previously described for the screen 40 and the screen 90. It will be noted that mobile solids will be prevented from entering the bottom end 132 of the screen 130 even if the end lacks an end wall because the end rests on the bottom of the wastewater container. Little or no scum layer accumulates inside the screen, facilitating the continued operability of the liquid level sensor used, particularly when it is a float, probe or proximity sensor.

Figure 11:
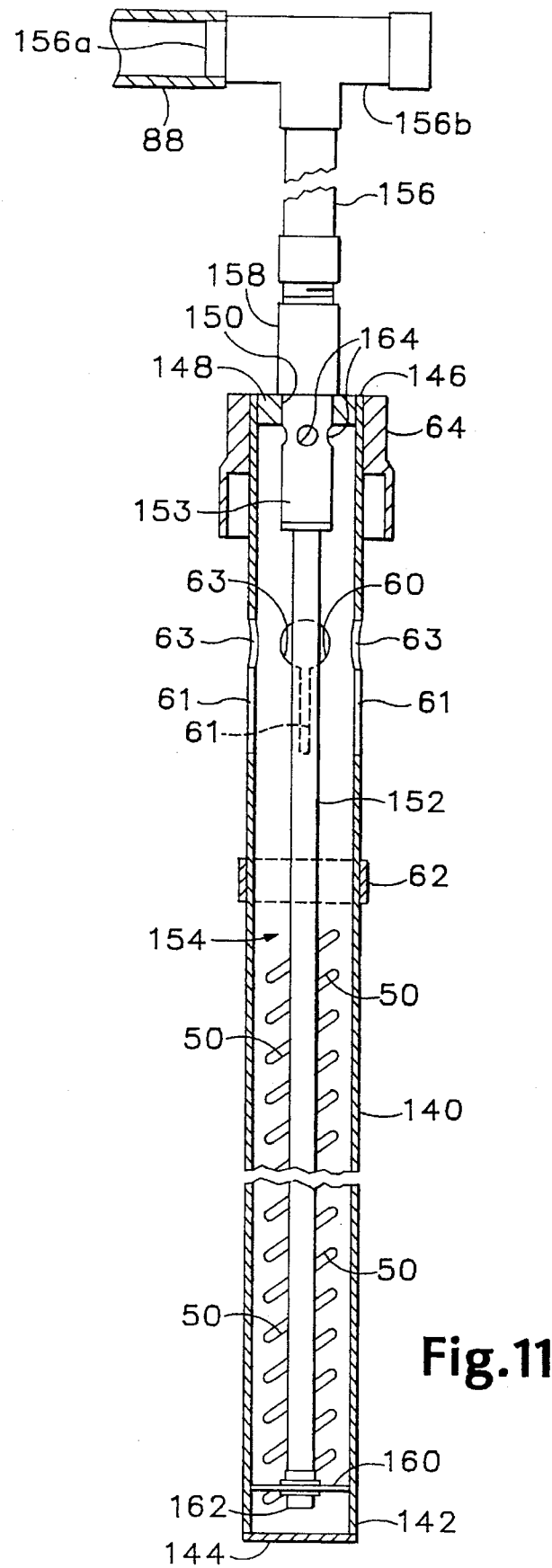
FIG. 11 is a sectional side view of an alternative embodiment of the screen of FIG. 7 shown at an enlarged scale.

An alternative embodiment of a screen for excluding solids from the effluent of the wastewater container of FIG. 7 is shown in FIG. 11. The screen 140 is a tube similar to the screen 90 of FIG. 7, with a bottom end 142 enclosed by an end wall 144 and a top end 146. As described previously, the screen 140 defines a plurality of spaced-apart, inclined slot-shaped apertures 50 distributed over a substantial portion of the length of the tube. Also, as described for the screen 90, the length of the screen 140 does not permit the screen to extend into the riser 26. Instead, the top end 146 of the tube includes a reducer bushing 148 defining an opening 150 large enough to permit the slidable passage of a pole assembly 152 of a permanently installed swab 154. A tee handle 156 is attached threadable within a female adapter 158 of the swab pole assembly 152 and a disc 160, similar to the disc 82 previously described, is attached proximate the bottom end 162 of the pole assembly. The pole assembly 152, including an entrance pipe section 153, the female adapter 158, and the handle 156 are preferably hollow with vents 164 located in the pipe section 153. An open end 156*a* of the handle 156 may be detachably coupled to the overflow conduit 88 of FIG. 7, the other end 156*b* being capped.

If the screen 140 becomes clogged, the swab 154 is operated to dislodge clogging solids from the apertures 50. The operator removes the conduit 88 and grasps the swab handle 156 to move the disc 160 up and down the length of the interior of the screen while the reducer bushing 148 prohibits removal of the swab. If the small diameter gravity sewer main to which the outlet is connected becomes clogged, the effluent will overflow through the vents 164 and handle 156 to the conduits 88 and 92, as described with respect to FIG. 7. Also, odor-producing gases from the sewer main will be vented through the vents 164 and conduits 88 and 92, also as described with respect to FIG. 7.

Whether or not the tee handle 156 is coupled to an overflow conduit 88, it preferably remains attached to the pole 152 since it is large enough to prevent an infant from falling into the riser. Alternatively, it could be unscrewed from the pole 152 and stored separately so that it remains clean, and is attached to the pole only for swabbing.

In all of the embodiments previously described, exposure of the interior of the tubular screen to the large solids in the scum layer 18 through the upper extremity of the screen in the event the container overflows is prevented either by elevating the top of the screen sufficiently or by removably capping the top in one of several ways. For example, in FIG. 8 the quick-disconnect coupling 98 performs such capping function, as does the pipe 110 with removable coupling 136 in FIG. 10. In FIG. 1, if the elevation of the top of the screen is insufficient to protect the top from exposure to the scum layer under overflow conditions, a removable cap (not shown) with one or more apertures small enough to prevent the passage of larger scum solids can be placed over the top 48 and over the finger hole 66 to perform the capping function (or placed within the top 48 if no chlorinator pipe is used). In FIG. 11, the reducer bushing 148 and pole assembly 152 perform the capping function. If the pole assembly 152 is not used as a coupling to an overflow conduit 88, a cap can be placed upon the top of the female adapter 158 or upon the open end 156*a* of the tee handle 156.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of treating wastewater, comprising:
   (a) flowing wastewater having a concentration of waste solids into a wastewater collection container through a wastewater inlet and allowing said solids to distribute into a lower horizontal sludge layer and an upper horizontal scum layer with a horizontal layer of liquid therebetween;
   (b) immersing a substantially upstanding elongate tube in said wastewater within said container and exposing the interior of said tube to said horizontal layer of liquid through a plurality of apertures in said tube;
   (c) flowing liquid from said horizontal layer through said apertures into the interior of said tube and thereafter through a liquid effluent outlet of said container; and
   (d) moving a cleaning implement along said interior of said tube while said tube remains immersed in said wastewater within said container and thereby cleaning said tube by dislodging solids from within said apertures into at least said horizontal layer of liquid in said wastewater collection container.

2. The method of claim 1 wherein said effluent outlet of said container includes a vertical tubular portion, and wherein step (b) includes enclosing a portion of said tube removably within said vertical tubular portion.

3. The method of claim 1 wherein said tube has an upper extremity, further including passing said cleaning implement into the interior of said tube through said upper extremity while said tube remains immersed in said wastewater within said container.

4. The method of claim 1, further including retaining said cleaning implement within said interior of said tube while performing step (c) while not performing step (d).

5. The method of claim 1, further including locating said apertures in positions extending vertically along a majority of the depth of said wastewater in said container.

6. A method of treating wastewater, comprising:
   (a) flowing wastewater having a concentration of waste solids into a wastewater collection container through a wastewater inlet and allowing said solids to distribute into a lower horizontal sludge layer and an upper horizontal scum layer with a horizontal layer of liquid therebetween;
   (b) immersing a substantially upstanding elongate tube in said wastewater within said container and exposing the interior of said tube to said horizontal layer of liquid through a plurality of apertures in said tube;
   (c) flowing liquid from said horizontal layer through said apertures into the interior of said tube and thereafter through a liquid effluent outlet of said container;
   (d) causing the exterior surface of said tube to contact said sludge layer and said horizontal layer of liquid, respectively; and
   (e) removing said tube from said container and inspecting the exterior surface of said tube to identify the portions thereof which have been in contact with said sludge layer and said horizontal layer of liquid, respectively.

7. The method of claim 6 wherein said effluent outlet of said container includes a vertical tubular portion, wherein step (b) includes enclosing a portion of said tube removably within said vertical tubular portion and wherein step (e) comprises removing said portion of said tube from within said vertical tubular portion.

8. The method of claim 6, further including moving a cleaning implement along said interior of said tube while said tube remains immersed in said wastewater within said container and thereby cleaning said tube.

9. A method of treating wastewater, comprising:
   (a) flowing wastewater having a concentration of waste solids into a wastewater collection container through a wastewater inlet and allowing said solids to distribute into a lower horizontal sludge layer and an upper horizontal scum layer with a horizontal layer of liquid therebetween;
   (b) immersing a substantially upstanding elongate tube in said wastewater within said container and exposing the interior of said tube to said horizontal layer of liquid through a plurality of apertures in said tube;

(c) flowing liquid from said horizontal layer through said apertures into the interior of said tube and thereafter through a liquid effluent outlet of said container; and (d) locating said apertures in positions extending vertically along a majority of the depth of said wastewater in said container and causing said apertures to contact said sludge layer and said horizontal layer of liquid, respectively, while substantially preventing the exposure of the interior of said tube to said scum layer through an upper extremity of said tube if said scum layer rises to the top of said container.

10. The method of claim 9 wherein said effluent outlet of said container includes a vertical tubular portion, and wherein step (b) includes enclosing a portion of said tube removably within said vertical tubular portion.

11. The method of claim 9, further including moving a cleaning implement along said interior of said tube while said tube remains immersed in said wastewater within said container and thereby cleaning said tube.

12. The method of claim 9 wherein step (c) includes flowing said liquid from the interior of said tube through a chlorinator chamber to said liquid effluent outlet.

13. A method of treating wastewater, comprising:

(a) flowing wastewater having a concentration of waste solids into a wastewater collection container through a wastewater inlet and allowing said solids to distribute into a lower horizontal sludge layer and an upper horizontal scum layer with a horizontal layer of liquid therebetween;

(b) immersing a substantially upstanding elongate tube in said wastewater within said container and exposing the interior of said tube to said horizontal layer of liquid;

(c) flowing liquid from said horizontal layer into the interior of said tube through a plurality of elongate slots in said tube, said slots being oriented longitudinally at an inclination and thereby preventing the passage through said slots of both horizontally and vertically oriented ones of said solids, and thereafter flowing said liquid through a liquid effluent outlet of said container.

14. The method of claim 13, further including locating said slots in positions extending vertically along a majority of the depth of said wastewater in said container.

15. The method of claim 13 wherein said effluent outlet of said container includes a vertical tubular portion, and wherein step (b) includes enclosing a portion of said tube removably within said vertical tubular portion.

16. The method of claim 13, further including moving a cleaning implement along said interior of said tube while said tube remains immersed in said wastewater within said container and thereby cleaning said tube.

17. The method of claim 13 wherein step (c) includes flowing said liquid from the interior of said tube through a chlorinator chamber to said liquid effluent outlet.

18. A method of treating wastewater, comprising:

(a) flowing wastewater having a concentration of waste solids into a wastewater collection container through a wastewater inlet and allowing said solids to distribute into a lower horizontal sludge layer and an upper horizontal scum layer with a horizontal layer of liquid therebetween;

(b) immersing a substantially upstanding elongate tube in said wastewater within said container and exposing the interior of said tube to said horizontal layer of liquid through a plurality of apertures in said tube;

(c) flowing liquid from said horizontal layer through said apertures into the interior of said tube and thereafter through a liquid effluent outlet of said container;

(d) flowing said liquid from the interior of said tube to said outlet through a first portion of an opening in said tube, said first portion having a first width, thereby providing a restriction on the volumetric flow rate of said liquid, and flowing said liquid from the interior of said tube to said outlet through a second portion of said opening in said tube located at a higher elevation than said first portion of said opening and having a second width greater than said first width, thereby lessening said restriction; and (e) chlorinating said liquid before flowing said liquid through said first portion so that said first portion restricts the volumetric flow rate of said liquid as said liquid is being chlorinated.

19. The method of claim 18 wherein said effluent outlet of said container includes a vertical tubular portion, and wherein step (b) includes enclosing a portion of said tube removably within said vertical tubular portion.

20. The method of claim 18, further including moving a cleaning implement along said interior of said tube while said tube remains immersed in said wastewater within said container and thereby cleaning said tube.

21. The method of claim 18, further including locating said apertures in positions extending vertically along a majority of the depth of said wastewater in said container.

22. A method of treating wastewater, comprising:

(a) flowing wastewater having a concentration of waste solids into a wastewater collection container through a wastewater inlet and allowing said solids to distribute into a lower horizontal sludge layer and an upper horizontal scum layer with a horizontal layer of liquid therebetween;

(b) immersing a substantially upstanding elongate tube in said wastewater within said container and exposing the interior of said tube to said horizontal layer of liquid through a plurality of apertures in said tube;

(c) flowing liquid from said horizontal layer through said apertures into the interior of said tube and thereafter out of said container to a first disposal site through a liquid effluent outlet of said container; and (d) flowing said liquid from the interior of said tube out of said container to a second disposal site through an overflow outlet in parallel with said liquid effluent outlet.

23. The method of claim 22 wherein said effluent outlet of said container includes a vertical tubular portion, and wherein step (b) includes enclosing a portion of said tube removably within said vertical tubular portion.

24. The method of claim 22, further including moving a cleaning implement along said interior of said tube while said tube remains immersed in said wastewater within said container and thereby cleaning said tube.

25. The method of claim 22, further including locating said apertures in positions extending vertically along a majority of the depth of said wastewater in said container.

26. The method of claim 22 wherein step (c) includes flowing said liquid from the interior of said tube through a chlorinator chamber to said liquid effluent outlet.

27. A method of treating wastewater, comprising:

(a) flowing wastewater having a concentration of waste solids into a wastewater collection container through a wastewater inlet and allowing said solids to distribute into a lower horizontal sludge layer and an upper horizontal scum layer with a horizontal layer of liquid therebetween;

(b) immersing a substantially upstanding elongate tube in said wastewater within said container and exposing the interior of said tube to said horizontal layer of liquid through a plurality of apertures in said tube;

(c) flowing liquid from said horizontal layer through said apertures into the interior of said tube and thereafter out of said container to a first disposal site through a liquid effluent outlet of said container; and (d) venting odor-producing gases from the interior of said tube to a second disposal site through an outlet in parallel with said liquid effluent outlet.

28. The method of claim 27 wherein said effluent outlet of said container includes a vertical tubular portion, and wherein step (b) includes enclosing a portion of said tube removably within said vertical tubular portion.

29. A method of treating wastewater, comprising:

(a) flowing wastewater having a concentration of waste solids into a wastewater collection container through a wastewater inlet and allowing said solids to distribute into a lower horizontal sludge layer and an upper horizontal scum layer with a horizontal layer of liquid therebetween;

(b) immersing a substantially upstanding elongate tube in said wastewater within said container and exposing the interior of said tube to said horizontal layer of liquid through a plurality of apertures in said tube;

(c) flowing liquid from said horizontal layer through said apertures into the interior of said tube and thereafter through a liquid effluent outlet of said container;

(d) moving a cleaning implement along said interior of said tube while said tube remains immersed in said wastewater within said container and thereby cleaning said tube; and (e) retaining said cleaning implement within said interior of said tube while performing step (c) while not performing step (d).

30. A method of treating wastewater, comprising:

(a) flowing wastewater having a concentration of waste solids into a wastewater collection container through a wastewater inlet and allowing said solids to distribute into a lower horizontal sludge layer and an upper horizontal scum layer with a horizontal layer of liquid therebetween;

(b) immersing a substantially upstanding elongate tube in said wastewater within said container and exposing the interior of said tube to said horizontal layer of liquid through a plurality of apertures in said tube;

(c) flowing liquid from said horizontal layer through said apertures into the interior of said tube and thereafter through a liquid effluent outlet of said container;

(d) flowing said liquid from the interior of said tube to said outlet through a first portion of an opening in said tube, said first portion having a first width, thereby providing a restriction on the volumetric flow rate of said liquid, and flowing said liquid from the interior of said tube to said outlet through a second portion of said opening in said tube located at a higher elevation than said first portion of said opening and having a second width greater than said first width, thereby lessening said restriction; and (e) maintaining liquid contact between said liquid flowing through said second portion and said liquid flowing through said first portion so as to resist clogging of said first portion of said opening.

* * * * *

UNITED STATES PATENT AND TRADEMARK OFFICE
CERTIFICATE OF CORRECTION

PATENT NO. : 5,569,387

DATED : October 29, 1996

INVENTOR(S) : William C. Bowne et al.

It is certified that error appears in the above-indentified patent and that said Letters Patent is hereby corrected as shown below:

Col. 4, line 34   Change "Of" to --of--

Col. 8, line 47   Change "80-through" to --80 through--

Signed and Sealed this

Eighteenth Day of February, 1997

Attest:

BRUCE LEHMAN

Attesting Officer                    Commissioner of Patents and Trademarks